(12) United States Patent
Malrait et al.

(10) Patent No.: US 11,784,603 B2
(45) Date of Patent: Oct. 10, 2023

(54) ADAPTING THE DECELERATION OF A MOTOR AS A FUNCTION OF AN AVERAGE RECTIFIED VOLTAGE

(71) Applicant: Schneider Toshiba Inverter Europe SAS, Pacy sur Eure (FR)

(72) Inventors: François Malrait, Jouy sur Eure (FR); Alain Dutrey, Fontaine sous Jouy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 210 days.

(21) Appl. No.: 16/712,155

(22) Filed: Dec. 12, 2019

(65) Prior Publication Data

US 2020/0204102 A1  Jun. 25, 2020

(30) Foreign Application Priority Data

Dec. 21, 2018  (FR) ........................................ 1873755

(51) Int. Cl.
    H02P 27/08  (2006.01)
(52) U.S. Cl.
    CPC .................................. H02P 27/08 (2013.01)
(58) Field of Classification Search
    CPC ...................................................... H02P 27/08
    See application file for complete search history.

(56) References Cited

U.S. PATENT DOCUMENTS

| | | | |
|---|---|---|---|
| 10,008,937 B1* | 6/2018 | Park ..................... | H02M 1/4208 |
| 2002/0085398 A1* | 7/2002 | Bixel ..................... | H02P 23/06 |
| | | | 363/41 |
| 2015/0357945 A1* | 12/2015 | Takahashi ................ | H02P 3/18 |
| | | | 318/400.2 |
| 2017/0244325 A1* | 8/2017 | Carralero .......... | H02M 3/33546 |

FOREIGN PATENT DOCUMENTS

| | | |
|---|---|---|
| EP | 1914428 | 4/2008 |
| JP | 2008043013 | 2/2008 |

OTHER PUBLICATIONS

Search Report and Written Opinion for French Patent Application No. FR1873755, dated Sep. 24, 2019, 8 pages.
English Language Machine Translation of Japanese Patent Application Publication No. JP2008043013, published on Feb. 21, 2008, 28 pages.

* cited by examiner

*Primary Examiner* — Muhammad S Islam
*Assistant Examiner* — Bradley R Brown
(74) *Attorney, Agent, or Firm* — Locke Lord LLP

(57) ABSTRACT

A method for adapting a deceleration of a motor powered by a variable speed drive, the variable speed drive comprising a plurality of at least N low-voltage power cells linked in series, N being greater than or equal to 1, the method comprising the following operations during a period of deceleration of the motor:

determination of at least one average motor voltage over a given period as a function of motor voltage values measured at the terminals of the motor over the given period;

as a function of the determined average motor voltage, determination of an average rectified voltage value, wherein a rectified voltage corresponds to a voltage obtained at the output of a rectifier of each power cell; and adaptation of the deceleration of the electrical device as a function of the average rectified voltage value.

20 Claims, 4 Drawing Sheets

ADAPTING THE DECELERATION OF A MOTOR AS A FUNCTION OF AN AVERAGE RECTIFIED VOLTAGE

TECHNICAL FIELD OF THE INVENTION

The invention relates to the control of the electrical power supply of a device such as a motor, and in particular the control of the control voltage of a variable speed drive of a motor.

STATE OF THE ART

According to a power topology of a variable speed drive, a high voltage is supplied by connecting in series a certain number of low-voltage convertors (that are then called "power cells") in the variable drive. The control of these power cells makes it possible to supply a voltage with several levels, or multi-level, each power cell adding a voltage making it possible to reach successive voltage levels.

According to the European standards, low voltage is understood to mean voltages lying between 0 and 1000 volts in alternating voltage regime and between 0 and 1500 volts in direct voltage regime. High voltage is understood to mean voltages greater than 1000 volts in alternating voltage regime and greater than 1500 volts in direct voltage regime.

A low-voltage variable drive can have a similar structure but with a single power cell.

A deceleration consists of a transfer of energy from a mechanical system (rotor shaft of the motor and driving load) to an electrical system (capacitors of the variable speed drive). The sum of the temporal differentials of the electrical and mechanical energies of the system (therefore of the corresponding powers) is therefore equal to the opposite of the power lost by the system.

When the motor is the actuator of a driving or inertial load, in deceleration phase, one of the following situations arises:
- the mechanical power supplied is greater than the total electrical losses, and it is necessary to dissipate the excess energy. The electrical energy can then be returned to the electrical network, to the variable speed drive or, alternatively, a braking resistor can be used to thermally dissipate the electrical energy. At low voltage, a braking resistor can be placed in series outside the variable speed drive, between the variable drive and the motor. In medium/high voltage, such a resistor cannot be used in that it would be too bulky;
- the mechanical power supplied is less than the total electrical losses (motor operation);
- the mechanical power supplied is equal to the electrical losses (zero total losses). The motor therefore supplies a braking power and there is no need to dissipate energy.

In order to manage a deceleration phase, a number of strategies exist. In deceleration phase, the motor can switch to generator mode and return electrical energy to the variable drive. The voltage on each power cell thus increases, and needs to be controlled in order to avoid damaging, even destroying, the capacitors of the power cells.

Most of the strategies are consequently based on a measurement of the direct current DC bus voltages. These voltages correspond to the rectified voltages at the input of each of the power cells of the variable speed drive. According to these solutions, the rectified voltages are interlocked and the control variable of the variable speed drive becomes the output torque of the motor. For example, by setting the maximum DC bus voltage at 800 V, the motor is made to decelerate until it approaches such a value, then the rectified voltage is regulated below that value by lowering the motor torque.

However, measuring such rectified voltages on each of the power cells is bulky and costly. Solutions then provide, without accessing these voltages, for setting the deceleration time at a very high value, so as not to provoke overvoltage on the capacitors of the power cells, thus avoiding damaging them. However, the deceleration of the motor is then extremely slow, which is not acceptable in the context of certain applications.

There is therefore a need to decelerate a motor rapidly, without energy dissipation system and while protecting the capacitors of the power cells of the variable speed drive.

The present invention resolves the abovementioned drawbacks.

SUMMARY OF THE INVENTION

A first aspect of the invention relates to a method for adapting a deceleration of a motor powered by a variable speed drive, the variable speed drive comprising a plurality of at least N low-voltage power cells linked in series, N being greater than or equal to 1, the method comprising the following operations during a period of deceleration of the motor:
determination of at least one average motor voltage over a given period as a function of motor voltage values measured at the terminals of the motor over the given period;
as a function of the determined average motor voltage, determination of an average rectified voltage value, wherein a rectified voltage corresponds to a voltage obtained at the output of a rectifier of each power cell;
adaptation of the deceleration of the electrical device as a function of the average rectified voltage value.

Thus, the invention makes it possible to access the rectified voltage (an average value) without requiring sensors on each power cell.

According to one embodiment, the determination of the average rectified voltage value is a function of the average motor voltage, of a reference motor voltage and of a reference rectified voltage, the reference motor voltage being obtained from a command received at the input of the variable speed drive and the reference rectified voltage being a default value.

Such an embodiment makes it possible to rapidly access the average rectified voltage value.

As a variant, the method can comprise the determination of at least one reference motor voltage, the reference motor voltage being interlocked with the average motor voltage measured by generation of a correction motor voltage, a control motor voltage being obtained from the reference motor voltage and from the correction voltage, and the average rectified voltage can be obtained from the average motor voltage, from the control motor voltage and from a reference rectified voltage, the reference rectified voltage being a default value.

This embodiment makes it possible to access the average rectified voltage value while interlocking the reference motor voltage.

According to one embodiment, the adaptation of the deceleration comprises the comparison of the average rectified voltage with at least one predefined threshold, and the modification of a torque applied to the motor as a function of a result of the comparison.

Thus, the control of the deceleration of the motor is optimized.

In addition, the threshold can be predefined as a function of a maximum voltage of the capacitors of the power cells of the variable speed drive.

Thus, this embodiment makes it possible to ensure the protection of the power cells.

According to one embodiment, the adaptation of the deceleration can comprise the replacement, for a subsequent period, of a reference rectified voltage by the average rectified voltage in order to determine command orders for the power cells of the variable speed drive, the reference rectified voltage being a default value.

Thus, the control of the power cells is optimized in the realization of the motor voltages.

According to one embodiment, the given period can be equal to a sampling period of a reference motor voltage at the input of the variable speed drive.

Such a synchronization makes it possible to facilitate the determination of the average rectified voltage.

According to one embodiment, the variable speed drive can comprise 3*N power cells, with three phases each comprising N power cells linked in series, and respective outputs of each phase can be linked in star configuration or delta configuration to the electric motor.

In addition, command orders for the power cells can be determined from a reference motor voltage and from an additional strategy voltage common to the three phases, the additional strategy voltage being determined so as to minimize a number of switchovers of switches of the power cells.

Thus, the number of switchovers of switches of the power cells can be minimized without changing the voltages applied to the motor.

A second aspect of the invention relates to a computer program that can be executed by a processor and comprising instructions for, when it is executed by the processor, implementing the steps of a method according to the first aspect of the invention.

A third aspect of the invention relates to a control device for adapting the deceleration of a motor powered by a variable speed drive, the variable speed drive comprising N low-voltage power cells linked in series, N being greater than or equal to 2. The control device comprises:

a unit configured to, during a period of deceleration of the motor, determine at least one average motor voltage over a given period as a function of motor voltage values measured at the terminals of the motor over the given period;

a unit configured to determine, as a function of the determined average motor voltage, an average rectified voltage value, wherein a rectified voltage corresponds to a voltage obtained at the output of a rectifier of each power cell;

a unit configured to adapt the deceleration of the electrical device as a function of the average rectified voltage value.

BRIEF DESCRIPTION OF THE FIGURES

Purely by way of example, the embodiments of the invention will be described with reference to the drawings, wherein.

DETAILED DESCRIPTION

Figure 1:
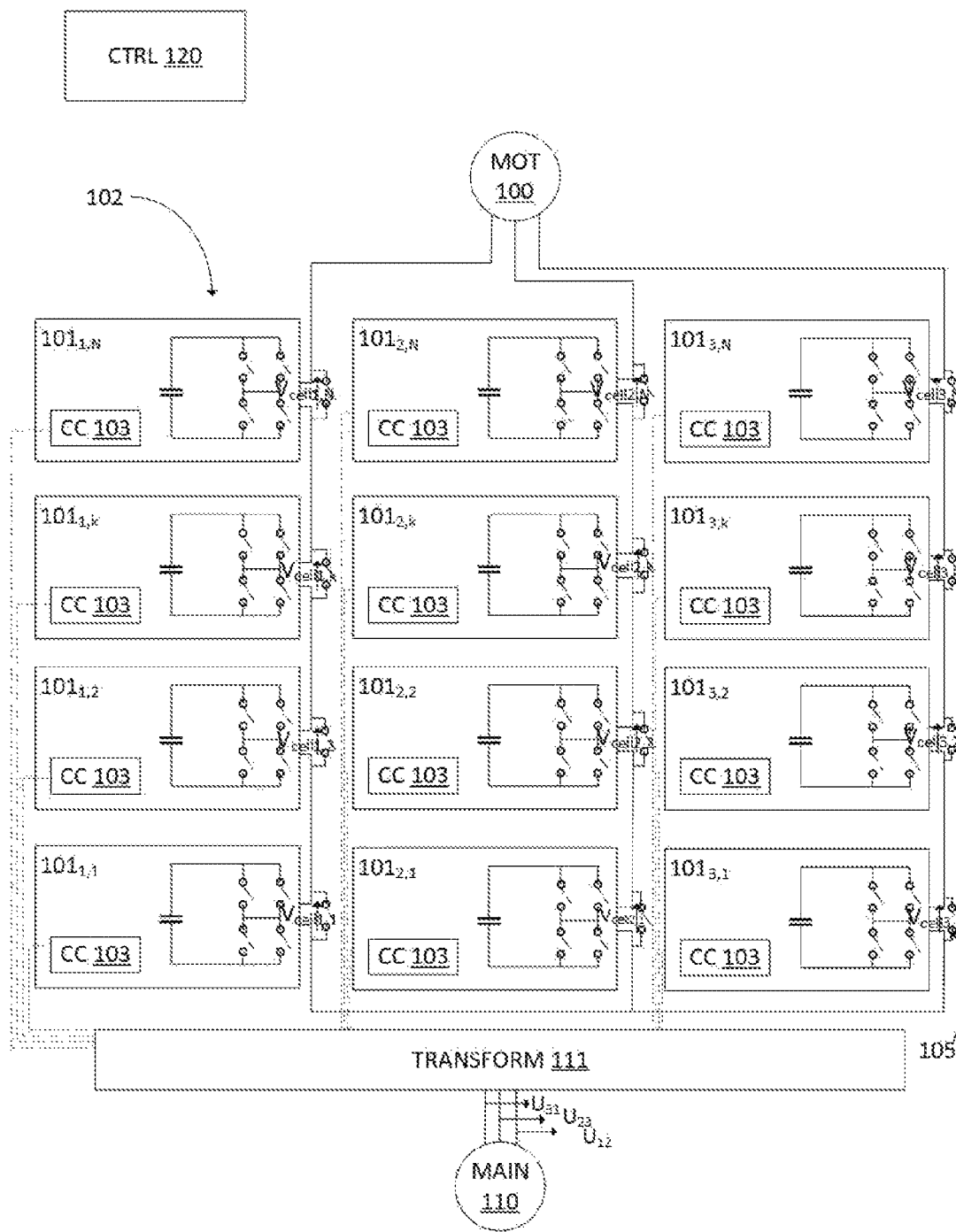
FIG. 1 illustrates a system for controlling the power supply of an electric motor according to an embodiment of the invention.

FIG. 1 presents a power supply system for an electric motor 100, such as an induction motor for example, powered by a three-phase variable power supply.

The variable speed drive 102 comprises a transformer 111 receiving a three-phase variable power supply from the mains 110. The secondary of the transformer 111 is linked to a power stage of the variable speed drive 102. The transformer 111 can be a multi-winding transformer so as to deliver voltages to several power cells described hereinbelow.

The power stage of the variable speed drive 102 can comprise one or more low-voltage power cells 101. In the case where the motor receives a three-phase power supply, the variable speed drive 102 comprises 3*N power cells, with N power cells dedicated to each phase, N being greater than or equal to 1.

In the case where N is equal to 1, the variable speed drive 102 is a low-voltage variable drive.

Each power cell 101 receives as input the three-phase power supply from the secondary of the transformer 111 and can comprise a rectifier (not represented in FIG. 1) at the input, the rectifier being able to rectify the three-phase variable power supply received so as to supply a direct voltage. The rectified voltage obtained for each power cell 101 is also called direct current DC bus voltage, or bus voltage. The rectifier can comprise a diode bridge, a thyristor bridge or any other known system for rectifying three-phase variable voltages. The rectifier at the input is thus an AC/DC converter.

Each power cell then comprises a capacitor capable of implementing an intermediate capacitive filtering.

At the output of the rectifier, each power cell 101 can comprise an inverter for generating a pulse width modulation PWM signal. Such an inverter can comprise an H bridge comprising four switches controlled in pairs. A power electronic system using such a chopped voltage principle applies to the motor 120, for each phase, a voltage which is proportional to one or more rectified voltages. On average, the proportion applied corresponds to the ratio between the control voltage and the reference rectified voltage (defined hereinbelow). The operation of an H bridge is well known and will not be described more in the present application.

The switches of a power cell 101 are controlled by a control cell 103 of the power cell 101.

The system also comprises a control device 120 capable of controlling the electrical power supply of the motor 100. To this end, the control device 120 can control the control cells 103 of the power cells 101. The control device 120 can also control switches 105 making it possible to connect in series a subset of the N power cells for each phase. As a variant, these switches are controlled by the control device 120 via the control cells 103.

The control cells 103 can receive command orders from the control device 120 from which the control cells 103 can apply a proportion, or duty cycle, to the rectified voltage, by controlling the switches of the H bridge. The switches of the H bridge can be transistors of insulated gate bipolar transistor IGBT type. The advantage of IGBT-type transistors is that they have a high switching speed.

The three-phase voltages powering the motor 100 are thus obtained by aggregating the PWM output voltages of the power cells 101 for which the switches 105 are closed.

Other functions of the control device will be detailed with reference to FIGS. 2 to 4.

Figure 2:
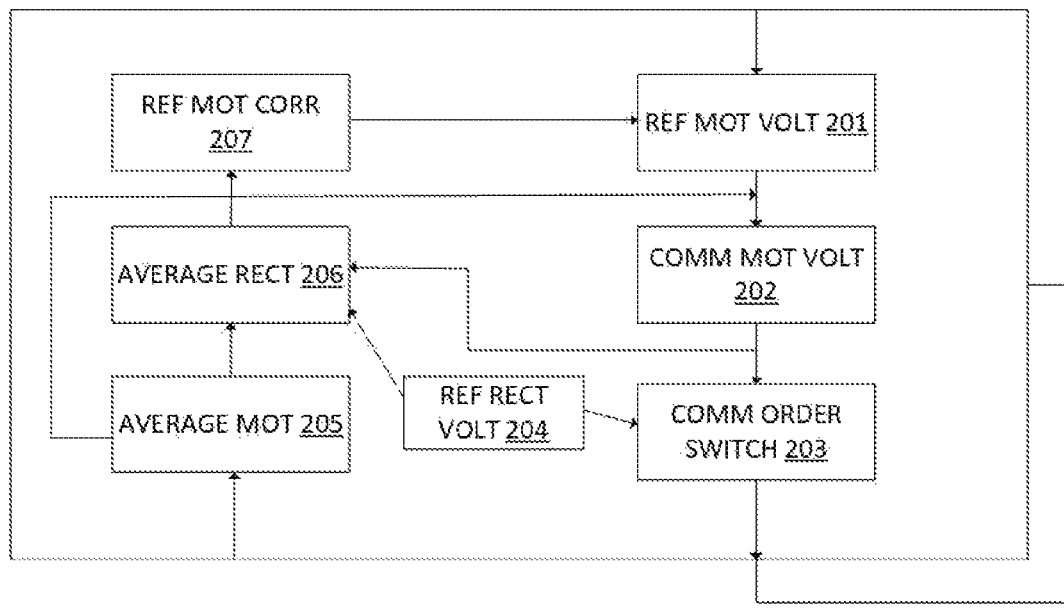
FIG. 2 illustrates the structure of a control device according to embodiments of the invention.

FIG. 2 presents a control device 120 according to certain embodiments of the invention.

The control device 120 comprises, to this end, a plurality of units dedicated to additional functions according to the invention. Each unit can be implemented by software, involving at least a processor and a memory, or by a monolithic set of electronic components programmed for a given function, such as a microprocessor or ASIC for example. As a variant, a single processor or a single monolithic set is configured to implement all of the additional functions of the control device 120 according to the invention.

The control device 120 receives as input a speed command (in particular a deceleration command in the context of the invention) which is processed by a reference motor voltage computation unit 201, configured to calculate reference motor voltages from the speed command. The reference motor voltages can be represented by a vector V123REF of three voltages denoted V1REF, V2REF and V3REF (one for each phase).

From the reference motor voltages V123REF, a control motor voltage computation unit 202 is configured to calculate control motor voltages. The control motor voltages can be represented by a vector V123CONTROL of three voltages denoted V1CONTROL, V2CONTROL and V3CONTROL.

In addition, according to the invention, the unit 202 is capable of receiving average motor voltages from the unit 205 described hereinbelow. The average motor voltages can be represented by a vector V123MEAS of three voltages denoted V1MEAS, V2MEAS and V3MEAS.

Based on a comparison between the reference motor voltages V123REF and the average motor voltages V123MEAS, the unit 202 can determine correction motor voltages represented by a vector V123CORRECTION of three correction values V1 CORRECTION, V2CORRECTION and V3CORRECTION.

The control device 120 also comprises a computation unit 203 for calculating the command orders for the chopping topology.

The unit 203 first determines command voltages, represented by the vector V123COMMAND of three voltages V1COMMAND, V2COMMAND and V3COMMAND on the basis of the control voltages V123CONTROL.

In the determination of the command voltages, the unit 203 can also take account of a motor strategy voltage VSTRATEGY which is a voltage value corresponding to an electrical neutral point of the motor, allowing the implementation of different switching PWM strategies.

The addition of one and the same VSTRATEGY value to all the phases of the variable speed drive does not affect the voltages applied to the motor. Indeed, each phase of the variable speed drive 102 supplies a potential Vi, i being the phase index, and the voltages applied to the motor are composed as a function of the potentials Vi.

In the case of a star configuration (whose architecture is known and not described further), by using Ui to denote one of the voltages applied to the motor, the following is obtained:

$$Ui = Vi - (V1 + V2 + V3)/3;$$

Thus, the value Ui is invariable with a VSTRATEGY value which would be added to the three output values V1, V2 and V3.

In the case of a delta configuration, by using Ui to denote one of the voltages applied to the motor, the following is obtained:

$$Ui = Vi - Vj, j \text{ being a phase index different from } i;$$

Once again, the Ui value is invariable with a VSTRATEGY value which would be added to the three output values V1, V2 and V3.

Thus, in both star and delta configuration cases, the addition of the VSTRATEGY value gives a degree of freedom for applying a dedicated strategy to different objectives, such as maximizing a coil voltage amplitude (voltage composed at the variable drive output), minimizing the switchovers, etc.

The unit 203 then calculates the command orders from the rectified voltage of each power cell 101, which is the voltage which is then chopped by the H bridge of the power cell 101. However, as indicated previously, such a rectified voltage is not directly measured in the context of the invention, and a reference rectified voltage VBUSDRIVE obtained from a reference voltage determination unit 204 is initially used in order to calculate the command orders.

For example, from the command voltages V123COMMAND and from the reference rectified voltage VBUSDRIVE, which is a default value, the unit 203 determines modulation ratios represented in the form of a vector m123 comprising the values m1, m2 and m3. Such modulation ratios are compared to triangular carriers in order to determine the following switching orders. Each modulation ratio m1, m2 and m3 can change values N times over a carrier period.

From the modulation ratios, the unit 203 also determines switching orders for the switches of the H bridges of the power cells 101, the switching orders being represented by a vector T123, comprising orders T1, T2 and T3 respectively for each of the three phases. The orders Ti are switching vectors, each component of the vector corresponding to a power cell of the branch i.

Each of the N components of the switching vector Ti can be obtained by comparison of the switching vector mi with the triangular carrier corresponding to the phase i.

The command orders can also comprise activation/deactivation orders for the switches 105 of the power cells.

The unit 203 is also configured to transmit the command orders used to control the switches 105, in order to activate or deactivate some of the power cells previously deactivated/activated, and/or to command the command cells 103 of the active power cells 101, in order to produce the PWM output voltages of the power cells.

The voltages are then realized in practice by the active power cells 101 of the variable speed drive 102, and the voltages realized are represented by a vector V123REALIZED, comprising the voltages V1 REALIZED, V2REALIZED and V3REALIZED corresponding to the three respective phases.

The control device 120 also comprises an average motor voltage computation unit 205. The unit 205 is capable of receiving continuous measurements, or discrete measurements at a given frequency, of the voltages applied to the motor. From the motor voltage measurements received over a given period, the unit 205 determines average motor voltages over the given period represented by a vector V123MEAS comprising the voltages V1MEAS, V2MEAS and V3MEAS for the three respective phases. Such a period can be set or variable. For example, the period used to average the motor voltages can be calculated from a sampling period of the reference motor voltages V123REF, which is technologically more readily feasible than a measurement of the motor voltages sampled as a function of the characteristic times of the power stage (the calculation of the reference motor voltages and the realization of the voltages for each power stage being synchronized).

Figure 4:
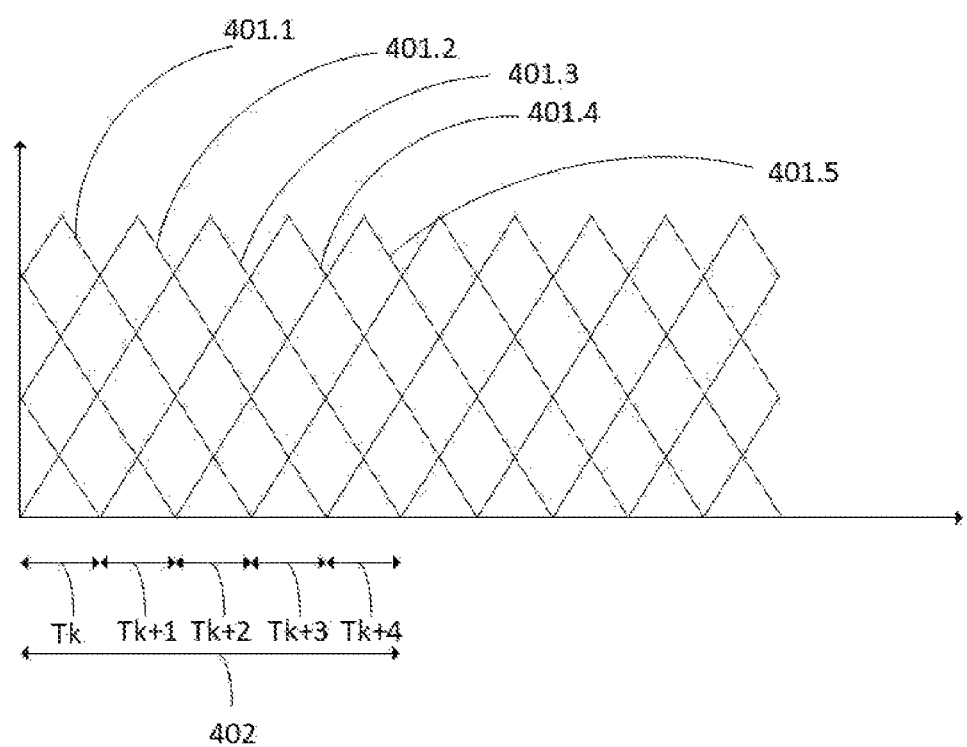
FIG. 4 illustrates the synchronization between the realization of the motor voltages and the calculation of the average rectified voltage of the variable speed drive, according to embodiments of the invention.

To this end, FIG. 4 illustrates the synchronization between the calculation of the average motor voltages and the realization of the voltages by the power stage.

FIG. 4 presents a case with five power cells for a phase of the variable speed drive.

The curves 401.1 to 401.5 represent the basic triangular signals used by the unit 203 to generate the switching orders T123 by comparison between the modulation ratios mi (m1, m2 or m3) and the triangular signals. Each triangular signal corresponds to one of the power cells of the phase. Such a comparison in order to determine the switching orders T123 of an H bridge of a power cell is well known and will not be described more. The triangular signals are voltage values that evolve over time (on the x-axis).

Successive periods Tk to Tk+5 are represented, corresponding to a fifth of the period 402 of the triangular signals. Such a period can correspond to a time for which, on average, the same active power is drawn from each of the three arms of the variable speed drive. During the period Tk+1:
  the reference V123REF, control V123CONTROL and command V123COMMAND voltages and the command orders T123 are calculated on the basis of the average motor voltages and of the average rectified voltage obtained from the period Tk;
  the command orders T123 calculated in the preceding step Tk are applied to the power cells in order to realize the voltages;
  the average motor voltages and the average rectified voltage are calculated over all the step Tk+1 to be used in the next step Tk+2.

Thus, the sampling frequency of the reference motor voltages V123REF can correspond to the frequency of realization of the PWM voltages (frequency of triangular signals making it possible to realize the PWM modulation in the power cells 101). Such a frequency can be set or can vary. For example, factors influencing the sampling frequency can be:
  a thermal protection of the power stage as a function of the thermal state of the variable speed drive 102;
  the protection of the H bridges of the power cells 101, comprising IGBT switches, the PWM frequency being adjusted as a function of the junction temperatures of the IGBT switches;
  upon the transition from a three-phase control to a two-phase control; and/or the application of a random component to the PWM frequency in order to reduce the noise.

The control device 120 also comprises an average rectified voltage computation unit 206, capable of calculating an average rectified voltage value VBUS from the average motor voltages. Two embodiments of the calculation of the average rectified voltage are given hereinbelow, by way of illustration.

First Embodiment

According to the first embodiment, the reference motor voltages V123REF are applied without corrections linked to the measured average voltages V123MEAS. The correction voltages V123CORRECTION are therefore not taken into account. According to this first embodiment, the average rectified voltage VBUS is calculated also from the reference motor voltages and from the reference rectified voltage, which emerges from the calculations detailed hereinbelow.

The balancing relationships between the different voltages of the system according to the first embodiment are:

$V123\text{CONTROL} = V123\text{REF}$ (the correction voltages $V123\text{CORRECTION}$ are not applied);

$V123\text{CORRECTION} = V123\text{REF} - V123\text{MEAS}$ (such a calculation is optional since the correction voltages $V123\text{CORRECTION}$ are not used);

$V123\text{COMMAND} = V123\text{ CONTROL} + (V123\text{COMPENSATION} + V\text{STRATEGY});$ V123COMPENSATION is a compensation vector comprising three components V1COMPENSATION, V2COMPENSATION and V3COMPENSATION; such a vector makes it possible to compensate for intrinsic drops at power components, denoted VDROP hereinbelow. Such voltage drops occur in the IGBT switches, in the diodes and also because of dead times introduced in order to avoid short circuits in the inverter. Alternatively, the compensation values being of low amplitudes, they can be disregarded at medium and high voltage (at medium and high speeds).

$V123\text{COMMAND}/V\text{BUSDRIVE} = m123;$ $m123 * V\text{BUS} - V123\text{DROP} = V123\text{REALIZED};$ (VBUS is the average rectified voltage to be determined and V123DROP is a vector of three components V1 DROP, V2DROP and V3DROP representing the voltage drop in the power stage for each of the three phases);

$V123\text{MEAS} = V123\text{REALIZED} - V\text{NO};$

VNO is a voltage value corresponding to the neutral point of the measurement unit. Such a value can be known in advance for example, by calibration.

From the preceding balancing relationships, the following relationships are obtained:

$V123\text{CORRECTION} = V123\text{REF} - V123\text{MEAS};$ $V123\text{COMMAND} = V123\text{REF} + (V123\text{COMPENSATION} + V\text{STRATEGY});$ $m123 = V123\text{REF}/V\text{BUSDRIVE} + (V123\text{COMPENSATION} + V\text{STRATEGY})/V\text{BUSDRIVE};$ $V123\text{REALIZED} = V123\text{REF} * gV + (V123\text{COMPENSATION} + V\text{STRATEGY}) * gV - V123\text{DROP};$ $V123\text{MEAS} = V123\text{REF} * gV + (V123\text{COMPENSATION} + V\text{STRATEGY}) * gV - V123\text{DROP} - V\text{NO};$ (gV being the VBUS/VBUSDRIVE ratio to be determined at the end of the method according to the invention).

By defining oV=(V123COMPENSATION+VSTRATEGY)*gV−V123DROP−VNO, the above relationships are simplified to:

$$V123MEAS = V123REF * gV + oV;$$

$$V123CONTROL = V123REF \text{ (operation of the unit 202 according to the first embodiment);}$$

$$V123CORRECTION = (1-gV) * V123REF - oV.$$

oV can be considered as an offset, representative of the imperfections of the power stage. If the imperfections are compensated, oV approaches 0.

In this case, gV=V123MEAS/V123REF, and the VBUS value can thus be determined.

The ratio presented above and allowing access to gV corresponds to the ratio of the amplitude of the vector V123MEAS to the amplitude of the vector V123REF.

For example, transformations of Clarke type can be considered, making it possible to transform a three-phase vector into a two-phase vector (often denoted (alpha, beta)).

It is thus possible to transform the three-phase vector of the following components:

$$V1 = V \cos(wt-phi) + VN;$$

$$V2 = V \cos(wt-phi-2\ pi/3) + VN;$$

$$V3 = V \cos(wt-phi-4\ pi/3) + VN,$$

into a two-phase system:

$$V\text{alpha} = V \cos(wt-phi);$$

$$V\text{beta} = V \sin(wt-phi).$$

From this two-phase system, polar coordinates can be deduced:

$$V\_amplitude = V \text{ (which corresponds to the amplitude which is referred to by the ratio } gV);$$

$$V\_phase = wt-phi.$$

Second Embodiment

According to the second embodiment, the unit 202 regulates the measured motor voltages V123MEAS to the reference motor voltages V123REF, by calculating the correction motor voltages V123CORRECTION, the unit 203 applying the correction motor voltages V123CORRECTION in the determination of the control voltages V123CONTROL.

According to the second embodiment, the average rectified voltage VBUS is calculated as for the first embodiment (therefore on the basis of the measured motor voltages V123MEAS and of the reference motor voltages V123REF), or by replacing the average motor voltages V123MEAS or the reference motor voltages V123REF by the correction motor voltages V123CORRECTION or by the command voltages V123COMMAND, as detailed in the calculations below.

The balancing relationships are written:

$$V123REF = V123MEAS;$$

$$V123CONTROL = V123REF + V123CORRECTION;$$

$$V123COMMAND = V123CONTROL + V123COMPENSATION + VSTRATEGY;$$

$$V123COMMAND/VBUSDRIVE = m123;$$

$$m123 * VBUS - V123DROP = V123\ REALIZED;$$

$$V123MEAS = V123REALIZED - VNO.$$

Or:

$$V123MEAS = V123REF;$$

$$V123CONTROL = V123REF + V123CORRECTION;$$

$$V123COMMAND = V123REF + V123CORRECTION + V123COMPENSATION + VSTRATEGY;$$

$$m123 = V123REF/VBUSDRIVE + (V123CORRECTION + V123COMPENSATION + VSTRATEGY)/VBUSDRIVE;$$

$$V123REALIZED = V123REF * gV + (V123CORRECTION + V123COMPENSATION + VSTRATEGY) * gV - V123DROP - VNO$$

By defining oV in the same way as for the first embodiment, the relationships are simplified to:

$$V123CORRECTION = (V123REF * (1-gV) - oV)/gV;$$

$$V123MEAS = V123REF;$$

$$V123CONTROL = V123REF/gV - oV/gV.$$

In the case where the offset oV is zero, that is to say the imperfections of the power stage are perfectly compensated, the following is obtained:

$$gV = V123MEAS/V123CONTROL, \text{ and the } VBUS \text{ value can thus be determined.}$$

Once the average rectified voltage VBUS is determined, according to any of the embodiments of the invention, the average rectified voltage VBUS can be used by the unit 204 as a replacement for the reference rectified voltage VBUSDRIVE for the next period. For example, the voltage VBUS can replace the reference rectified voltage VBUSDRIVE in a memory of the unit 204.

As a function of the average rectified voltage value VBUS, the motor torque can be controlled in order to control the deceleration. For example, the reference motor voltages V123REF can be controlled by a unit 207. For example, if the average rectified voltage VBUS is less than a first threshold th1, the deceleration of the motor can be increased. If the average rectified voltage lies between the first threshold th1 and a second threshold th2, the second threshold th2 being an acceptable limit voltage for the capacitors of the power cells 101, the deceleration can be gradually reduced in order to not reinject energy that can no longer be stored or dissipated. If the average rectified voltage is greater than th2, then the variable speed drive 102 stops controlling the motor in order to protect the variable speed drive 102.

The values th1 and th2 can be predetermined. As a variant, or complementarily, the comparison of the average rectified voltage value VBUS can be compared with the thresholds th1 and th2 in order to control the power supply frequency of the electrical device.

Figure 3:
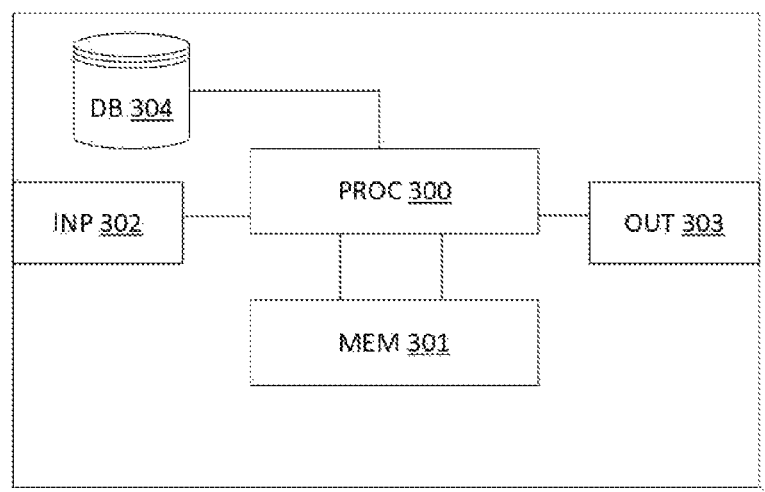
FIG. 3 illustrates the structure of the units of the control device according to embodiments of the invention.

FIG. 3 illustrates the structure of the units of the control device according to an embodiment of the invention.

Each of the units presented previously with reference to FIG. 2 can comprise the structure illustrated in FIG. 3. Alternatively, each of these units, or some of them, can be in the form of an electronic circuit dedicated to the performance of the function which is specific to it. Such a dedicated electronic circuit can be a microcontroller or a monolithic ASIC configured for the function which is specific to it.

The unit comprises a processor 300 capable of communicating bidirectionally, via buses, with a memory 301 such as a random-access memory RAM, a read-only memory ROM, a flash memory, a hard disk and/or any type of storage medium. The processor 300 is capable of executing instructions for the performance of the function which is specific to it. The unit also comprises an input interface 302 and an output interface 303 in order to communicate with the other entities of the control device, to receive voltage measurements, to transmit/receive commands.

The unit can also comprise a database for storing the data used for the performance of the function which is specific to the unit.

According to a variant, the processor 300 can perform the functions of all of the units 201 to 207 described previously with reference to FIG. 2.

Figure 5:
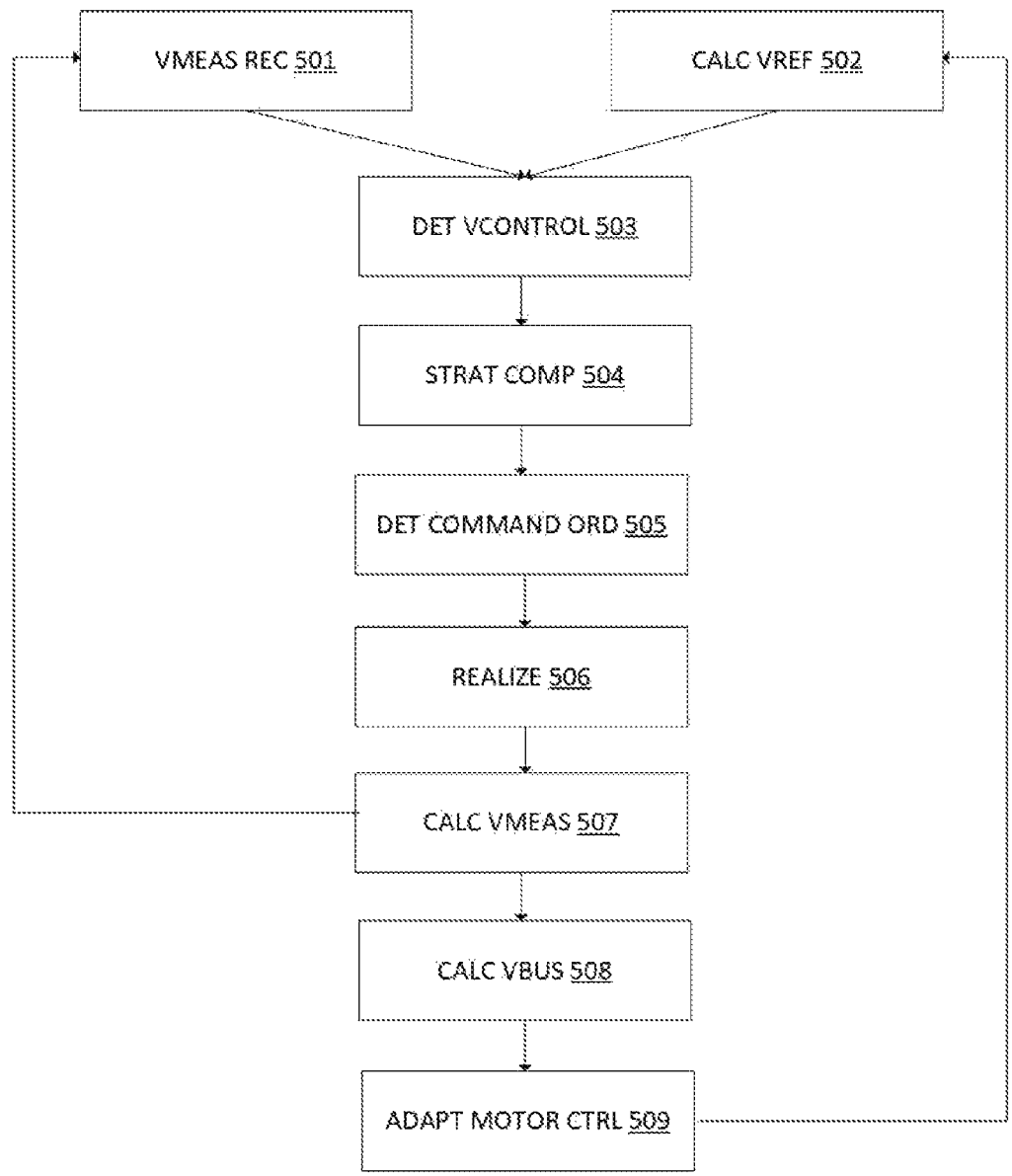
FIG. 5 is a diagram illustrating the steps of a method according to embodiments of the invention.

FIG. 5 is a diagram illustrating the steps of a method according to several embodiments of the invention.

The steps 501 to 509 are implemented during a current period consecutive to a preceding period.

In a step 501, the unit 201 receives an average motor voltage obtained from measurements performed over the preceding period, as detailed with reference to FIG. 2.

In parallel, in the step 502, the unit 201 can calculate reference motor voltages V123REF, as detailed with reference to FIG. 2.

In a step 503, the unit 202 determines control voltages V123CONTROL, according to the first embodiment (by copying the reference motor voltages V123REF) or according to the second embodiment of the invention (by taking into consideration the correction voltages V123CORRECTION).

In a step 504, the unit 203 can use the voltages VSTRATEGY and V123COMPENSATION to determine command voltages V123COMMAND from the control voltages V123CONTROL, such a step being optional, the command voltages V123COMMAND being able to be deduced directly from the control voltages V123CONTROL.

In a step 505, the unit 203 determines the command orders for the power stage T123, as detailed hereinabove.

The command orders T123 are then transmitted to the three branches of the power stage for the realization of the motor voltages V123REALIZED in a step 506.

In a step 507, on reception of the motor voltage measurements, the average motor voltages V123MEAS are determined by the unit 205, as detailed hereinabove. The average motor voltages V123MEAS determined can be used during the step 501 of a subsequent period consecutive to the current phase.

In a step 508, the average rectified voltage VBUS can be determined by the unit 206 as detailed hereinabove. The average rectified voltage VBUS can replace the reference rectified voltage VBUSDRIVE in the unit 204.

In a step 509, the control of the motor is adapted as a function of the average rectified voltage VBUS. For example, such a control can comprise the replacement of the reference rectified voltage VBUSDRIVE by the average rectified voltage VBUS and/or the modification of the frequency of the motor or of the reference motor voltages V123REF by the unit 207 (return to the step 502 for the next period), or by modifying the motor torque.

Although the present invention has been described above with reference to particular embodiments, the invention is in no way limited to the forms described. The invention is only limited by what is defined in the claims and embodiments other than those described above can fall within the scope of the claims.

Furthermore, although the embodiments have been described above as a combination of components and/or functions, it will be clearly understood that alternative embodiments can be obtained by other combinations of components and/or functions without in any way departing from the scope of the invention.

The invention claimed is:

1. A method for adapting a deceleration of a motor powered by a variable speed drive, the variable speed drive comprising a plurality of at least N low-voltage power cells linked in series, N being greater than or equal to 1, the method comprising the following operations during a period of deceleration of the motor:
   determining at least one average motor voltage over a given period as a function of motor voltage values measured at the terminals of the motor over the given period;
   as a function of the determined average motor voltage, determining an average rectified voltage value, wherein a rectified voltage corresponds to a voltage obtained at the output of a rectifier of each power cell; and
   controlling the deceleration of the motor as a function of the average rectified voltage value.

2. The method according to claim 1, wherein determining the average rectified voltage value is a function of the average motor voltage, of a reference motor voltage and of a reference rectified voltage, the reference motor voltage being obtained from a command received at the input of the variable speed drive and the reference rectified voltage being a default value.

3. The method according to claim 1, wherein the method comprises determining at least one reference motor voltage, wherein the reference motor voltage is interlocked with the average motor voltage measured by generating a correction motor voltage, a control motor voltage being obtained from the reference motor voltage and from the correction voltage,
   wherein the average rectified voltage is obtained from the average motor voltage, from the control motor voltage and from a reference rectified voltage, the reference rectified voltage being a default value.

4. The method according to claim 1, wherein controlling the deceleration comprises comparing the average rectified voltage with at least one predefined threshold, and modifying a torque applied to the motor as a function of a result of the comparison.

5. The method according to claim 4, wherein the threshold is predefined as a function of a maximum voltage of the capacitors of the power cells of the variable speed drive.

6. The method according to claim 1, wherein controlling the deceleration comprises replacing, for a subsequent period, a reference rectified voltage by the average rectified voltage in order to determine command orders for the power cells of the variable speed drive,
   the reference rectified voltage being a default value.

7. The method according to claim 1, wherein the given period is equal to a sampling period of a reference motor voltage at the input of the variable speed drive.

8. The method according to claim 1, wherein the variable speed drive comprises 3*N power cells, with three phases each comprising N power cells linked in series, wherein respective outputs of each phase are linked in star configuration or delta configuration to the electric motor.

9. The method according to claim 8, wherein command orders of the power cells are determined from a reference motor voltage and from an additional strategy voltage common to the three phases, the additional strategy voltage being determined so as to minimize a number of switchovers of switches of the power cells.

10. A computer program product comprising a non-transitory processor readable medium having processor readable instructions stored thereon, which when executed by a processor, causes the processor to implement the method according to claim 1.

11. A control device for adapting the deceleration of a motor powered by a variable speed drive, the variable speed drive comprising N low-voltage power cells linked in series, N being greater than or equal to 1, the control device comprising:
- a unit configured to, during a period of deceleration of the motor, determine at least one average motor voltage over a given period as a function of motor voltage values measured at the terminals of the motor over the given period;
- a unit configured to determine, as a function of the determined average motor voltage, an average rectified voltage value, wherein a rectified voltage corresponds to a voltage obtained at the output of a rectifier of each power cell; and
- a unit configured to control the deceleration of the motor as a function of the average rectified voltage value.

12. A control device for adapting the deceleration of a motor powered by a variable speed drive, the variable speed drive comprising N low-voltage power cells linked in series, N being greater than or equal to 1, the control device comprising:
- at least one processor; and
- at least one memory in communication with the at least one processor, the at least one memory storing processor executable instructions, which when executed by the at least one processor cause the control device to perform:
- during a period of deceleration of the motor, determining at least one average motor voltage over a given period as a function of motor voltage values measured at the terminals of the motor over the given period;
- determining, as a function of the determined average motor voltage, an average rectified voltage value, wherein a rectified voltage corresponds to a voltage obtained at the output of a rectifier of each power cell; and
- controlling the deceleration of the motor as a function of the average rectified voltage value.

13. The method of claim 1, wherein the controlling reduces or increases the deceleration of the motor as a function of the average rectified voltage.

14. The method of claim 13, wherein the controlling reduces the deceleration to avoid reinjecting energy.

15. The method of claim 1, wherein the controlling increases the deceleration of the motor when the average rectified voltage is less than a first threshold, and reduces the deceleration of the motor when the average rectified voltage lies between the first threshold and a second threshold, the second threshold being a limit voltage for capacitors of the power cells.

16. The method of claim 1, wherein the controlling controls a speed of the deceleration of the motor as a function of the average rectified voltage.

17. The method of claim 1, wherein the determining the averaged rectified voltage comprises:
- calculating the average rectified voltage from the at least one average motor voltage.

18. The method of claim 17, wherein the determining at least one average motor voltage determines an average motor voltage for each phase from a plurality of phases of the variable speed drive, and
- the calculating an average rectified voltage value calculates the average rectified voltage from the average motor voltage for each phase from the plurality of phases of the variable speed drive.

19. The method of claim 1, wherein as a function of the determined average motor voltage, the determining the averaged rectified voltage determines an average rectified voltage value for the power cells from the at least one average motor voltage.

20. The method of claim 1, further comprising:
- measuring the motor voltage values at the terminals of the motor over the given period,
- wherein the determining at least one average motor voltage determines the average motor voltage from the measured motor voltage values.

* * * * *